United States Patent
Davis

(10) Patent No.: US 11,111,859 B2
(45) Date of Patent: Sep. 7, 2021

(54) METHOD AND CONTROL SYSTEM FOR CONTROLLING COMPRESSOR OUTPUT OF A GAS TURBINE ENGINE

(71) Applicant: Solar Turbines Incorporated, San Diego, CA (US)

(72) Inventor: Peter Davis, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 393 days.

(21) Appl. No.: 16/596,453

(22) Filed: Oct. 8, 2019

(65) Prior Publication Data
US 2021/0102503 A1 Apr. 8, 2021

(51) Int. Cl.
*F02C 9/28* (2006.01)
*F02C 7/22* (2006.01)

(52) U.S. Cl.
CPC .......... *F02C 9/28* (2013.01); *F02C 7/22* (2013.01); *F05D 2240/35* (2013.01); *F05D 2240/60* (2013.01); *F05D 2270/023* (2013.01); *F05D 2270/303* (2013.01); *F05D 2270/304* (2013.01)

(58) Field of Classification Search
CPC ...... F02C 3/04; F02C 7/22; F02C 7/26; F02C 9/00; F02C 9/28; F02C 9/46; F05D 2240/35; F05D 2240/60; F05D 2270/023; F05D 2270/303; F05D 2270/304; F01D 15/10; F01D 21/02
See application file for complete search history.

(56) References Cited

U.S. PATENT DOCUMENTS

| | | | |
|---|---|---|---|
| 7,188,475 B2 | 3/2007 | Honeywell | |
| 10,202,906 B2 | 2/2019 | Hitachi | |
| 2005/0056021 A1 | 3/2005 | Belokon | |
| 2013/0227959 A1 | 9/2013 | Ainslie | |
| 2013/0291549 A1* | 11/2013 | Martin | F02C 9/56 60/773 |
| 2015/0345385 A1* | 12/2015 | Santini | F02C 9/20 290/52 |
| 2016/0298486 A1 | 10/2016 | Langford | |

FOREIGN PATENT DOCUMENTS

JP 2010037762 A 2/1998

OTHER PUBLICATIONS

Stephen Pope, Rolls-Royce Completes First Ground Test of Hybrid-Electric Propulsion System, magazine article, Mar. 19, 2019, 3 pages, Flying, Bonnier Corporation, Florida, USA.

* cited by examiner

*Primary Examiner* — Jesse S Bogue
*Assistant Examiner* — Loren C Edwards
(74) *Attorney, Agent, or Firm* — Procopio, Cory, Hargeaves & Savitch LLP

(57) ABSTRACT

A method and control system for controlling compressor output for a gas turbine engine is disclosed. The power output of a gas turbine engine can vary and be below desired output levels due to operating conditions such as ambient temperature and elevation. These operating conditions can lead to lower output of the gas compressor of the turbine engine and lower operating temperatures within or proximate to a turbine of the gas turbine engine and lead to less power output. Additional fuel can be added to increase power to the gas producer shaft and increase turbine temperature of the gas turbine engine. A power transfer device can be used to remove or add power to the gas producer shaft to balance the gas producer mechanical limits and turbine (Continued)

thermal limits at maximum levels and lead to higher power output.

16 Claims, 3 Drawing Sheets

METHOD AND CONTROL SYSTEM FOR CONTROLLING COMPRESSOR OUTPUT OF A GAS TURBINE ENGINE

TECHNICAL FIELD

The present disclosure generally pertains to gas turbine engines. More particularly this application is directed toward a method and control system for controlling compressor output of a gas turbine engine.

BACKGROUND

Gas turbine engines can maximize output power and efficiency at a given ambient temperature by designing the gas producer shaft speed and at maximum power turbine temperature limits to be met simultaneously. This is known as the match temperature. In a typical turbine engine this situation occurs at a single ambient temperature. However, if power can be independently input or withdrawn from the gas producer shaft it is possible to stay optimized at all ambient temperature, increasing the maximum power capability.

U.S. Pat. No. 7,188,475 to McGinley et al. describes a two spool gas turbine engine used to drive variable speed loads, such as an electric generator, or the fan/propeller of an aircraft engine. The gas turbine engine is designed to withstand transient speed and temperature conditions which are encountered when sudden changes to the load on the generator, fan, or propeller occur. By adding a relatively small motor/generator to the gas generator spool of the gas turbine engine, the compressor speed and airflow can be quickly adjusted to compensate for external load changes. This reduces the severity and duration of the transient conditions, resulting in decreased operation and reliability problems such as overspeed, compressor surge, and high turbine temperature. The motor/generator may also be used as an engine starting device.

The present disclosure is directed toward overcoming one or more of the problems discovered by the inventors.

SUMMARY

A method for controlling compressor output of a two shaft gas turbine engine is disclosed herein. The method includes determining a gas producer shaft speed and a temperature of the turbine. The method further includes in response to the gas producer shaft speed being below a gas producer shaft speed threshold and the temperature of the turbine being within a predetermined range of a turbine temperature threshold, increasing the amount of fuel to be combusted within the combustion chamber and by applying additional power to the gas producer shaft with the power transfer device. The method further includes in response to the gas producer shaft speed being within a predetermined range of the gas producer shaft speed threshold and the measured turbine temperature being below the turbine temperature threshold increasing the amount of fuel to be combusted within the combustion chamber and by removing power from the gas producer shaft with the power transfer device.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that embodiments of the disclosure can be practiced without these specific details. In some instances, well-known structures and components are shown in simplified form for brevity of description.

Figure 1:
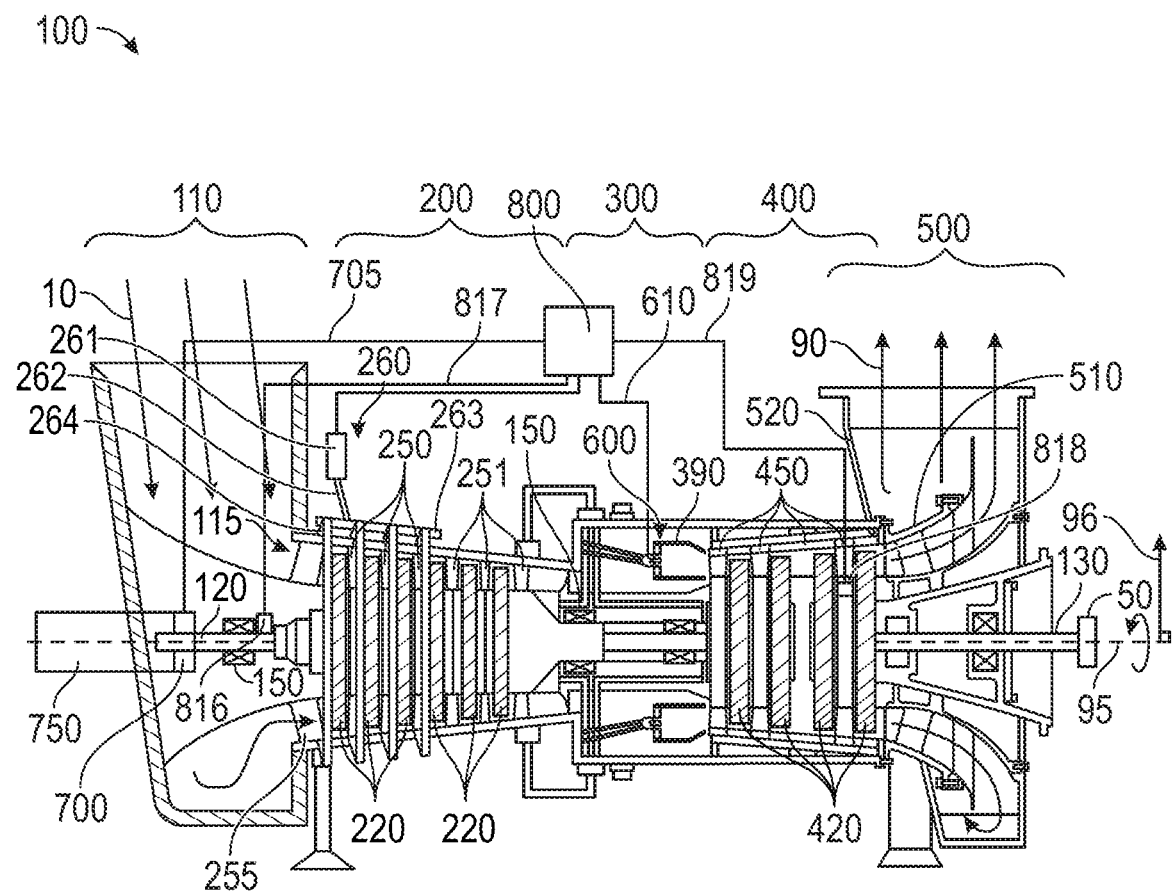
FIG. 1 is a schematic illustration of an exemplary gas turbine engine.

FIG. 1 is a schematic illustration of an exemplary gas turbine engine. Some of the surfaces have been left out or exaggerated for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its gas producer shaft 120 (sometimes referred to as a gas producer rotor) and power turbine shaft 130 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

Where the drawing includes multiple instances of the same feature, for example bearing assemblies 150, the reference number is only shown in connection with one instance of the feature to improve the clarity and readability of the drawing. This is also true in other drawings which include multiple instances of the same feature.

A gas turbine engine 100 can be referred to as a two shaft gas turbine engine and include a gas producer shaft 120 and a power turbine shaft 130. The gas producer shaft 120 and power turbine shaft 130 can be independent and rotate at different speeds.

The gas turbine engine 100 includes an inlet 110, a gas producer or compressor 200, a combustor 300, a turbine 400, an exhaust 500, and a power output coupling 50.

The compressor 200 includes one or more compressor rotor assemblies 220, inlet guide vanes 255, and one or more compressor variable guide vanes 250 and fixed guide vanes 251 (sometimes referred to as stators or stationary vanes). The variable guide vanes 250 or the fixed guide vanes 251 axially follow each of the compressor disk assemblies 220. In some embodiments, the guide vanes 250 within the first few compressor stages are variable guide vanes. The variable guide vanes 250 may each be rotated about their own axis to control gas flow.

The inlet guide vanes 255 axially can precede the variable guide vanes 250. The inlet guide vanes 255 may be rotated to modify or control the inlet flow area of the compressor 200 by an actuation system 260. In some embodiments, the inlet guide vanes 255 are variable guide vanes and may be rotated about their own axis.

The actuation system 260 can include an actuator 261, actuator arm 262, and a linkage system 263. The actuator 261 can move actuator arm 262 that moves or translates the components of the linkage system 263. The linkage system 263 can include linkage arms 264. A linkage arm 264 may be connected to each inlet guide vane 255 and each variable guide vane 250. When the actuator arm 262 is moved it causes each linkage arm 264 to be moved and rotate each inlet guide vane 255 and each variable guide vane 250. The actuator 261, actuator arm 262, and linkage arms 264 may be coupled together and configured to rotate each variable guide vane the same amount. In an embodiment the action system 260 is in electrical communication with a program logic controller 800. The program logic controller 800 can send commands to the actuation system 260 such that the actuation system 260 changes the position of the inlet guide vanes 255 and the variable guide vanes 250.

The combustor 300 includes one or more fuel injectors 600 (sometimes referred to as injectors) and includes one or more combustion chambers 390. The turbine 400 includes one or more turbine rotor assemblies 420 and one or more nozzle assemblies 450. The exhaust 500 includes an exhaust diffuser 510 and an exhaust collector 520.

One or more of the rotating components are coupled to each other and driven by the gas producer shaft 120 or the power turbine shaft 130. The power turbine shaft 130 can be axially separated from the gas producer shaft 120 and be located downstream from the gas producer shaft 120.

As illustrated, the combustor 300 may include a combustion chamber 390 or "liner". Depending on its configuration, the combustor 300 may include one or more of the above components. For example, the combustor 300 may include a plurality of injectors 600 annularly distributed around the center axis 95.

In operation, air 10 enters the gas turbine engine 100 via its inlet 110 as a "working fluid", and is compressed by the compressor 200. In the compressor 200, the working fluid is compressed by the series of compressor rotor assemblies 220. In particular, the air 10 is compressed in numbered "stages", the stages being associated with each compressor rotor assembly 220. For example, "4th stage air" may be associated with the 4th compressor rotor assembly 220 in the downstream or "aft" direction. While only five stages are illustrated here, the compressor 200 may include many more stages or fewer stages.

Similar to the compressor rotor assemblies 220, the turbine rotor assemblies 420 and nozzle assemblies 450 can be positioned in numbered "stages". The stages can be associated with the position of each turbine rotor assembly 420 and nozzle assembly 450 in the order that they received combusted air. For example, $3^{rd}$ stage combusted air may be associated with a third stage nozzle assembly of the nozzle assemblies 450. Alternatively, the stages can be associated with the position of each turbine rotor assembly 420 and nozzle assembly 450 in the order that they are received by the power turbine shaft 130. For example, the nozzle assemblies 450 can include a first power turbine stage nozzle assembly that represents the first nozzle assembly 450 located proximate to the power turbine shaft 130.

Once compressed air 10 leaves the compressor 200, it enters the combustor 300, where it is diffused and fuel is added. Air 10 and fuel are injected into the combustion chamber 390 via injector 600 and ignited. After the combustion reaction, energy is then extracted from the combusted fuel/air mixture via the turbine 400 by each stage of the series of turbine rotor assemblies 420. The initial stages (for example stages one and two) of the turbine 400 drive the gas producer shaft 120, thus driving the compressor 200. The combusted air progresses within the turbine 400 and the last stage or stages (for example stage three and four) of the turbine 400 drives the power turbine shaft 130, thus generating power to the power output coupling 50. This portion of the turbine 400 can be referred to as a power turbine. In an embodiment the gas producer shaft 120 and power turbine shaft 130 are separated proximate a $3^{rd}$ stage of the turbine 400.

Exhaust gas 90 may then be diffused in exhaust diffuser 510 and collected, redirected, and exit the system via an exhaust collector 520. Exhaust gas 90 may also be further processed (e.g., to reduce harmful emissions, and/or to recover heat from the exhaust gas 90).

The gas turbine engine 100 can include a power transfer device 700 and a gearbox 750. In an embodiment the power transfer device 700 and gearbox 750 are located proximate to the forward end of the gas turbine engine 100. The gearbox 750 can be connected to the gas producer shaft 120. The power transfer device 700 can be an electric motor and generator that can be connected to the gas producer shaft 120. In other examples the power transfer device 700 can represent a brake to absorb power and a turbo expander to provide power to the gas producer shaft 120. The power transfer device 700 can add or subtract power from the gas producer shaft 120. The power transfer device 700 can be connected to the gearbox 750 and may transmit power to the gearbox 750. In other examples the power transfer device 700 is part of the gearbox 750 and the gearbox 750 can import and export power from the gas producer shaft 120.

The gas turbine engine 100 can include a programmable logic controller (PLC) 800. The programmable logic controller 800 can be used to control components of the gas turbine engine 100, engine load, and other off package devices. Power transfer device conduit 705 can extend between the PLC 800 and the power transfer device 700. The PLC 800 can be in signal communication with the power transfer device 700 via the power transfer device conduit 705.

The PLC 800 can be connected to a speed sensor 816 and a temperature sensor 818. The speed sensor 816 can be located adjacent to the gas producer shaft 120. The speed sensor 816 can be configured to capture speed information related to gas producer shaft 120 as it rotates about the center axis 95 during operation, also referred to as gas producer shaft speed (referred to as "NGP").

The gas turbine engine 100 can include speed sensor conduit 817 that can extend from the speed sensor 816 to the PLC 800. The speed sensor conduit 817 can provide signal communication between the speed sensor 816 and the PLC 800. The PLC 800 can determine the NGP based on the captured speed information from the speed sensor 816.

The temperature sensor 818 can be located within the turbine 400. In the embodiment, the temperature sensor 818 is located within the $4^{th}$ stage of the nozzle assemblies 450. In other examples the temperature sensor 818 can be located within the $3^{rd}$ stage or 4th stage of the turbine rotor assemblies 420 and nozzle assemblies 450. In an example the temperature sensor 818 is located within the power turbine section of the turbine 400. In another example the temperature sensor is located downstream of the gas producer shaft 120. The temperature sensor 818 can be configured to capture information related to the temperature within the turbine at a specific location and this temperature can be referred to as T5. Typically T5 can be measured and used to model T3, turbine rotor inlet temp. In a standard engine the T3/T5 ratio can be fairly constant. T3 is usually the thermal limit of the gas turbine engine 100.

The gas turbine engine 100 can include temperature sensor conduit 819 that can extend from the temperature sensor 818 to the PLC 800. The temperature sensor conduit 819 can provide signal communication between the temperature sensor 818 and the PLC 800. The PLC 800 can determine T5 based on the captured temperature information from the temperature sensor 818.

The gas turbine engine 100 can include fuel injector conduit 610 that extends from the fuel injector 600 to the PLC 800. The fuel injector conduit 610 can provide signal communication between the fuel injector 600 and the PLC 800. The PLC 800 can provide signals to the fuel injector 600 to instruct the fuel injector to increase or decrease the amount of fuel being injected by the fuel injector 600.

In an example the PLC 800 can communicate with the power transfer device 700, fuel injectors 600, and sensors 816, 818, wirelessly.

In an embodiment the power transfer device 700 and PLC 800 make up a control system.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

Figure 2:
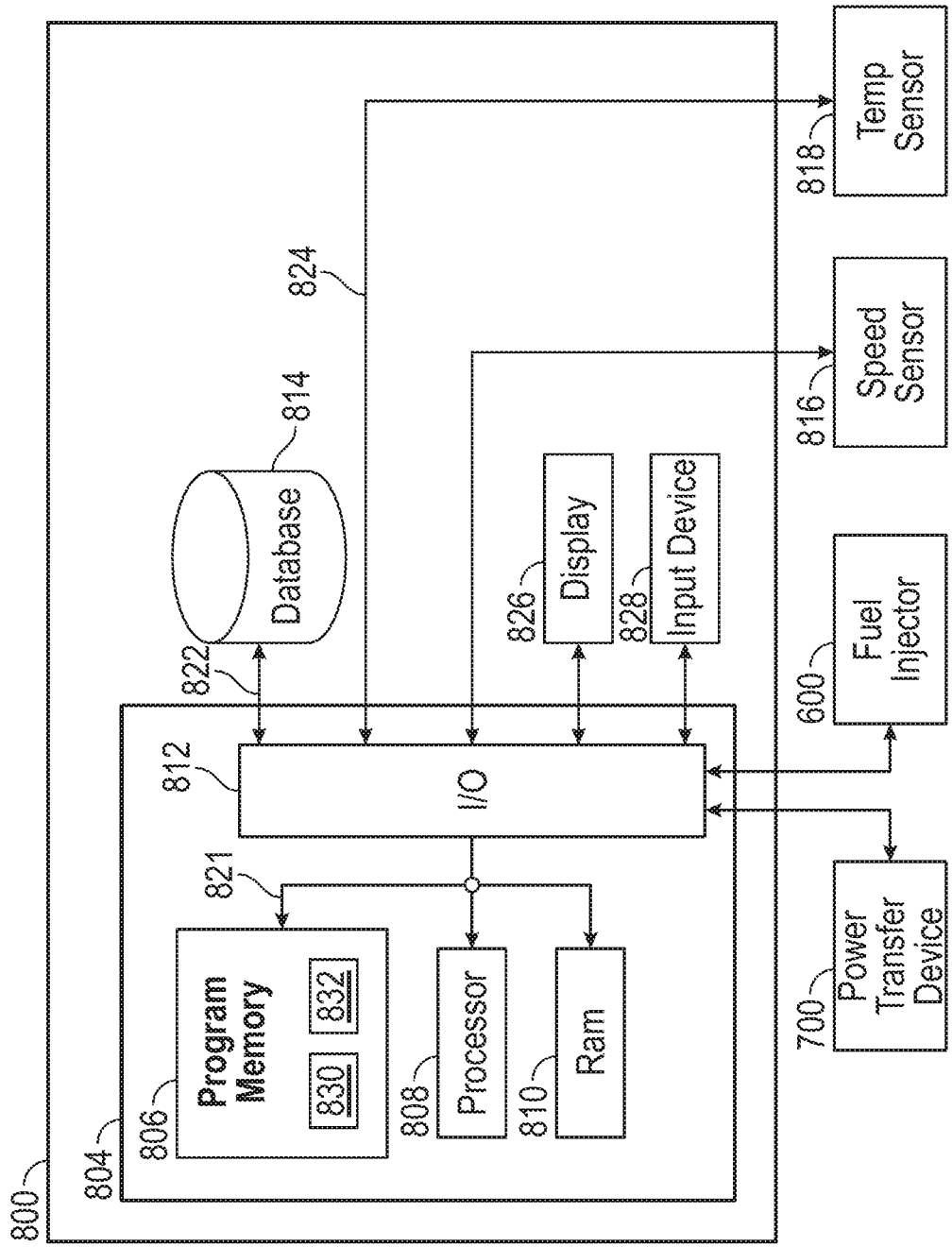
FIG. 2 is a functional block diagram of an embodiment of the programmable logic controller from FIG. 1.

FIG. 2 is a functional block diagram of an embodiment of the programmable logic controller from FIG. 1. The PLC 800 may be in digital communication with the power transfer device 700, fuel injector 600, speed sensor 816 and temperature sensor 818. The PLC 800 may have a controller 804 operatively connected to a database 814 via a link 822 connected to an input/output (I/O) circuit 812. It should be noted that, while not shown, additional databases 814 may be linked to the controller 804 in a known manner. Furthermore, these databases 814 may be external to the PLC 800.

In one embodiment the controller 804 includes a program memory 806, the processor 808 (may be called a microcontroller or a microprocessor), a random-access memory (RAM) 810, and the input/output (I/O) circuit 812, all of which are interconnected via an address/data bus 821. It should be appreciated that although only one microprocessor 808 is shown, the controller 804 may include multiple microprocessors 808. Similarly, the memory of the controller 804 may include multiple RAMs 810 and multiple program memories 806. Although the I/O circuit 812 is shown as a single block, it should be appreciated that the I/O circuit 812 may include a number of different types of I/O circuits. The RAM(s) 810 and the program memories 806 may be implemented as semiconductor memories, magnetically readable memories, nonvolatile memories, and/or optically readable memories, for example.

The program memory 806 and RAM 810 can be a non-transitory computer-readable medium having stored thereon computer-executable code (e.g., disclosed software or subroutines) and/or data. In one embodiment, the program memory also includes long-term or permanent memory, such as flash memory and/or ROM. The program memory 806 and/or the RAM 810 may store various applications (i.e., machine readable instructions) for execution by the microprocessor 808. For example, an operating system 830 may generally control the operation of the PLC 800 and provide a user interface to the PLC 800 to implement the processes described herein. The program memory 806 and/or the RAM 810 may also store a variety of software 832 for accessing specific functions of the PLC 800.

By way of example, and without limitation, the software 832 may include, among other things: obtaining the digital signal associated with speed information provided by speed sensor 816, generating a NGP value, comparing the NGP value to a gas producer shaft speed threshold (NGPmax), also referred to as NGP topped, sending digital signals to the power transfer device 700 in response to the NGP being lower than the NGPmax, obtaining the digital signal associated with temperature information provided by the temperature sensor 818, generating a T5 value, comparing the T5 value to a turbine temperature threshold (T5max), also referred to as T topped, sending digital signals to the power transfer device 700 in response to the T5 being lower than the T5max, sending digital signals to the fuel injector 600 to increase the amount of fuel being injected into the combustion chamber 390 if the NGP is less than the NGPmax and/or the T5 is less than the T5max.

The software 832 may include subroutines to execute any of the operations described herein. In an example the software 832 can be firmware. The software 832 may include other subroutines, for example, interfacing with other hardware in the PLC 800, etc. The program memory 806 and/or the RAM 810 may further store data related to the configuration and/or operation of the PLC 800, and/or related to the operation of one or more software 832. For example, data may be data gathered from the speed sensor 816 and temperature sensor 818, data determined and/or calculated by the processor 808, etc. In addition to the controller 804, the PLC 800 may include other hardware resources. The PLC 800 may also include various types of input/output hardware such as the visual display 826 and input device(s) 828 (e.g., keypad, keyboard, etc.). It may be advantageous for the PLC 800 to communicate with a broader network (not shown) through any of a number of known networking devices and techniques (e.g., through a computer network such as an intranet, the Internet, etc.).

INDUSTRIAL APPLICABILITY

The present disclosure generally applies to increasing the power generation of gas turbine engines 100. The described embodiments are not limited to use in conjunction with a particular type of gas turbine engine 100, but rather may be applied to stationary or motive gas turbine engines, or any variant thereof. Gas turbine engines, and thus their components, may be suited for any number of industrial applications, such as, but not limited to, various aspects of the oil and natural gas industry (including include transmission, gathering, storage, withdrawal, and lifting of oil and natural gas), power generation industry, cogeneration, aerospace and transportation industry, to name a few examples.

Gas turbine engines 100 can be designed and calibrated to operate at/near a gas producer shaft speed threshold (NGPmax), such as at 100% maximum design speed, and a turbine temperature threshold (T5max). Gas turbine engines 100 are designed to prevent operating above the NGPmax and T5max values, but can lose out on power output if operated below either the NGPmax and T5max values. By adjusting the position of the inlet guide vanes 255 and the variable guide vanes 250, adding or subtracting power from the gas producer using the power transfer device 700, and adding fuel to the combustor 300, the NGP and T5 values can be brought up and closer to NGPmax and T5max values, additional power output can be captured via the power turbine shaft 130.

The turbine temperature threshold (T5max) is to limit the temperature experienced within the gas turbine engine 100 proximate to area of the combustion chamber 390 and the first stage of the nozzle assemblies 450, also referred to as the "hot section". If the hot section is exposed to temperatures above the design limits the gas turbine engine 100 can experience detrimental effects such as increased wear. Temperature, sometimes referred to as T3, within the hot section, can be very high during engine operation. The T3 value is typically inferred by T5 which is at a different, cooler location. The ratio between T3 and T5 values can be predicted and can be used to infer temperature values within the gas turbine engine 100 in areas such as the hot section. Using the maximum design temperature (T3max) for the hot section and the ratio between T3 and T5 the turbine temperature threshold (T5max) can be determined.

These gas turbine engines 100 are typically designed for a particular ambient temperature (for example 59 degrees Fahrenheit) and elevation. Operating different from these design conditions can promote the gas turbine engine 100 to operate below the gas producer shaft speed threshold (NGPmax) and/or the turbine temperature threshold (T5max) and thus limit the power output of the gas turbine engine 100.

Typically, the gas producer shaft 120 derives its power from the first few stages of the turbine rotors 420 and nozzle assemblies 150. In a disclosed embodiment, a power transfer device 700 can be used to increase or decrease NGP to improve the power output of the gas turbine engine 100.

Figure 3:
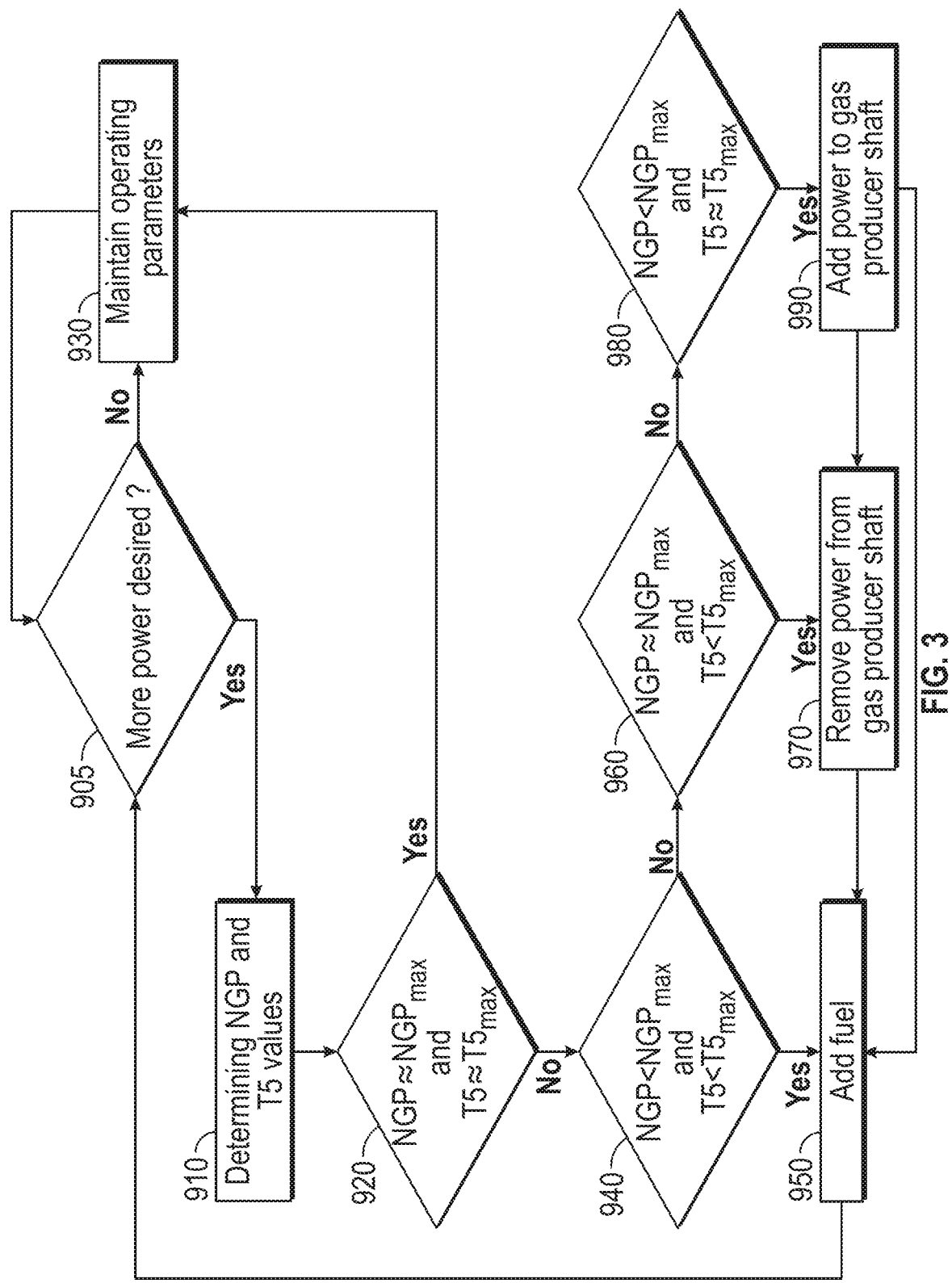
FIG. 3 is a flowchart of a method for controlling the speed of the gas producer shaft of the gas turbine engine from FIG. 1.

FIG. 3 is a flowchart of a method for controlling the speed of a gas producer shaft of the gas turbine engine from FIG. 1. The following description of the flowchart also makes reference to elements depicted in FIG. 2.

The method/process 900 begins at block 905 and includes the PLC 800 checking if more power is desired from the gas turbine engine 100. If more power is desired, the process continues to block 910. If more power is not desired the process proceed to block 930 and maintains the operating parameters for the duration of the process interval.

At block 910, the PLC 800 determining a gas producer shaft speed (NGP) and a turbine temperature (T5). The PLC 800 can receive the gas produced shaft speed information captured by the speed sensor 816 and determine the NGP. The PLC 800 can receive the turbine temperature information captured by the temperature sensor 818 and determine the T5 value.

At block 920, the PLC 800 compares the NGP value to the NGPmax value and the T5 to the T5max value. If NGP is approximately equal to NGPmax and the T5 value is approximately equal to T5max then the PLC 800 proceeds to block 930. In other words, if the NGP is within a predetermined range of the NGPmax and the T5 value is within a predetermined range of the T5max then the PLC 800 proceeds to block 930.

If NGP is not approximately equal to the NGPmax and/or the T5 value is not approximately equal to the T5max then proceed to block 940. In other words, if NGP is not within a predetermined range of NGPmax and/or the T5 value is not within a predetermined range of T5max then proceed to block 940.

At block 930, the PLC 800 maintains the operating parameters and does not send out digital signals to the fuel injectors 600 and power transfer device 700 to make additional adjustments. The process 900 is then repeated starting back at block 910.

At block 940, the PLC 800 compares the NGP value to the NGPmax value and the T5 to the T5max value. If NGP is below NGPmax and the T5 value is below T5max then the PLC 800 proceeds to block 950. If NGP is not below NGPmax or the T5 value is not below T5max then the PLC 800 proceeds to block 960.

At block 950, the PLC 800 sends digital signals to the fuel injector 600 to increase the fuel injection amount. The fuel injector 600 then injects additional fuel to be combusted within the combustion chamber 390 of the gas turbine engine 100. In an example the PLC 800 communicates to the fuel injector to increase the fuel amount until NGP is approximately at/within a predetermined range of NGPmax and/or T5 is approximately at/ a predetermined range of T5max.

At block 960, the PLC 800 compares the NGP value to the NGPmax value and the T5 to the T5max value. If NGP is within a predetermined range of NGPmax and the T5 value is below T5max then the PLC 800 proceeds to block 970. In an example if NGP is within a predetermined range of NGPmax and the inlet guide vanes 255 and variable guide vanes 250 are in a maximum position and the T5 value is below T5max, then the PLC 800 proceeds to block 970. If NGP is not within the predetermined range of NGPmax then the PLC 800 proceeds to block 980.

At block 970, the PLC 800 sends digital signals to the power transfer device 700 to remove power from the gas producer shaft 120. The power transfer device 700 then removes power from the gas producer shaft 120. The PLC 800 then proceeds to block 950 where additional fuel is added. The additional fuel added leads to an increase of power to the gas producer shaft 120 to balance the power removed from the gas producer shaft 120 by the power transfer device 700 (block 970) to maintain NGP within the predetermined range of NGPmax. value. In an example the additional fuel added also leads to an increased T5 value to bring T5 to within a predetermined range of T5max. The PLC 800 then proceeds to return to block 910 to repeat the process 900.

At block 980, the PLC 800 compares the NGP value to the NGPmax value and the T5 to the T5max value. If NGP is below NGPmax and the T5 value is within a predetermined range of T5max then the PLC 800 proceeds to block 990. In an example if T5 is within a predetermined range of T5max and the inlet guide vanes 255 and variable guide vanes 250 are not in a maximum position, and the NGP value is below NGPmax, then the PLC 800 proceeds to block 990.

At block 990, the PLC 800 sends digital signals to the power transfer device 700 to increase power to the gas producer shaft 120. The power transfer device 700 then applies additional power to the gas producer shaft 120. The additional power to the gas producer shaft 120 leads to additional cooling effects provided by the compressor 200.

The PLC 800 then proceeds to block 950 where additional fuel is added. The additional fuel added leads to an increase of temperature to balance the cooling effects provided by the additional air from the increase in power to the gas producer shaft 120 (Block 990) and maintains the T5 value within a predetermined range of T5max. The additional fuel added and additional power provided by the power transfer device 700 also leads to an increased NGP. In an example the increased NGP is to bring NGP within a predetermined range of NGPmax. The PLC 800 then proceeds to return to block 910 to repeat the process 900.

In an embodiment, the process of FIG. 3 can be implemented at intervals of 100 milliseconds.

The steps of a method or algorithm or the functions of a module, unit or block described in connection with the embodiments disclosed herein can be embodied directly in hardware, in a software module executed by a processor, or in a combination of the two. Furthermore, those of skill in the art will appreciate that the various illustrative logical blocks, modules, units, and method steps described in connection with the above described figures and the embodiments disclosed herein can often be implemented as electronic hardware, computer software, or combinations of both. To clearly illustrate this interchangeability of hardware and software, various illustrative components, blocks, modules, units, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module, block, unit or step is for ease of description. Specific functions or steps can be moved from one module, block or unit to another without departing from the disclosure.

Although this disclosure has been shown and described with respect to detailed embodiments thereof, it will be understood by those skilled in the art that various changes in form and detail thereof may be made without departing from the spirit and scope of the claimed disclosure. Accordingly, the preceding detailed description is merely exemplary in nature and is not intended to limit the disclosure or the application and uses of the disclosure. In particular, the described embodiments are not limited to use in conjunction with a particular type of gas turbine engine. For example, the described embodiments may be applied to stationary or motive gas turbine engines, or any variant thereof. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

It will be understood that the benefits and advantages described above may relate to one embodiment or may relate to several embodiments. The embodiments are not limited to those that solve any or all of the stated problems or those that have any or all of the stated benefits and advantages.

What is claimed is:

1. A method for controlling a gas producer shaft speed of a two-shaft gas turbine engine having a combustion chamber, a gas producer shaft, a turbine, and a power transfer device, the method comprising:
    determining the gas producer shaft speed and a temperature of the turbine;
    in response to the gas producer shaft speed being below a gas producer shaft speed threshold and the temperature of the turbine being within a predetermined range of a turbine temperature threshold, increasing an amount of fuel to be combusted within the combustion chamber and applying additional power to the gas producer shaft with the power transfer device; and
    in response to the gas producer shaft speed being within a predetermined range of the gas producer shaft speed threshold and the turbine temperature being below the turbine temperature threshold, increasing the amount of fuel to be combusted within the combustion chamber and removing power from the gas producer shaft with the power transfer device.

2. The method of claim 1, wherein the method further comprises:
    in response to the gas producer shaft speed being below the gas producer shaft speed threshold and the temperature of the turbine being below the turbine temperature threshold, increasing the amount of fuel to be combusted within the combustion chamber.

3. The method of claim 2, wherein the method further comprises:
    in response to the gas producer shaft speed being within the predetermined range of the gas producer shaft speed threshold and the temperature of the turbine being within the predetermined range of the turbine temperature threshold, not increasing the gas producer shaft speed, not decreasing the gas producer shaft speed, and not increasing the amount of fuel to be added for combustion.

4. The method of claim 1, wherein the gas producer speed threshold is approximately 100% of maximum design speed.

5. A programmable logic controller for a two-shaft gas turbine engine having a plurality of variable guide vanes, a combustion chamber, a gas producer shaft, a turbine, and a power transfer device, the programmable logic controller comprising:
    at least one processor; and
    a non-transitory memory in communication with the at least one processor and storing software that, when executed by the at least one processor causes the programmable logic controller to
    determine a gas producer shaft speed and a temperature of the turbine,
    in response to the gas producer shaft speed being below a gas producer shaft speed threshold and the temperature of the turbine being within a predetermined range of a turbine temperature threshold, increase an amount of fuel to be combusted within the combustion chamber and by applying additional power to the gas producer shaft with the power transfer device; and
    in response to the gas producer shaft speed being within a predetermined range of the gas producer shaft speed threshold and the turbine temperature being below the turbine temperature threshold, increase the amount of fuel to be combusted within the combustion chamber and by removing power from the gas producer shaft with the power transfer device.

6. The programmable logic controller of claim 5, wherein the memory storing software that, when executed by the at least one processor further causes the programmable logic controller to, in response to the gas producer shaft speed being below the gas producer shaft speed threshold and the temperature of the turbine being below the turbine temperature threshold, increase the gas producer shaft speed by increasing the amount of fuel to be combusted within the combustion chamber.

7. The programmable logic controller of claim 5, wherein the memory storing software that, when executed by the at least one processor further causes the programmable logic controller to, in response to the gas producer shaft speed being within the predetermined range of the gas producer shaft speed threshold and the temperature of the turbine being within the predetermined range of the turbine temperature threshold, not decrease the gas producer shaft speed, and not allow an increase in the amount of fuel for combustion.

8. The programmable logic controller of claim 5, wherein the gas producer speed threshold is approximately 100% of maximum design speed.

9. The programmable logic controller of claim 5, wherein the memory storing software that, when executed by the at least one processor further causes the programmable logic controller to, in response to the gas producer shaft speed being below the gas producer shaft speed threshold, the variable guide vanes not being in a maximum position, and the temperature of the turbine being within the predetermined range of the turbine temperature threshold, increase the amount of fuel to be combusted within the combustion chamber and apply additional power to the gas producer shaft with the power transfer device.

10. The programmable logic controller of claim 9, wherein the memory storing software that, when executed by the at least one processor further causes the programmable logic controller to, in response to the gas producer shaft speed being within the predetermined range of the gas producer shaft speed threshold, the variable guide vanes being in the maximum position, and the measured turbine temperature being below the turbine temperature threshold, increase the amount of fuel to be combusted within the combustion chamber and remove power from the gas producer shaft with the power transfer device.

11. A two-shaft gas turbine engine including the programmable logic controller of claim 5, the two-shaft gas turbine engine further including
the power transfer device configured to increase power to and remove power from the gas producer shaft.

12. A programmable logic controller for a two-shaft gas turbine engine having a combustion chamber, a gas producer shaft, a turbine, and a power transfer device, the programmable logic controller comprising:
at least one processor; and
a non-transitory memory in communication with the at least one processor and storing software that, when executed by the at least one processor causes the programmable logic controller to
determine a gas producer shaft speed and a temperature of the turbine;
in response to the gas producer shaft speed being below a gas producer shaft speed threshold and the temperature of the turbine being within a predetermined range of a turbine temperature threshold, increase the gas producer shaft speed by applying additional power to the gas producer shaft with the power transfer device; and
in response to the gas producer shaft speed being within a predetermined range of the gas producer shaft speed threshold and the turbine temperature being below the turbine temperature threshold, decrease the speed of the gas producer shaft by removing power from the gas producer shaft with the power transfer device.

13. The programmable logic controller of claim 12, wherein the memory storing software that, when executed by the at least one processor further causes the programmable logic controller to, in response to the gas producer shaft speed being below the gas producer shaft speed threshold and the temperature of the turbine being below the turbine temperature threshold, increase the gas producer shaft speed by allowing an increase in an amount of fuel to be combusted by the two-shaft gas turbine engine.

14. The programmable logic controller of claim 12, wherein the memory storing software that, when executed by the at least one processor further causes the programmable logic controller to, in response to the gas producer shaft speed being within the predetermined range of the gas producer shaft speed threshold and the temperature of the turbine being within the predetermined range of the turbine temperature threshold, not increase the gas producer shaft speed, not decrease the gas producer shaft speed, and not increase an amount of fuel to be added for combustion.

15. The programmable logic controller of claim 12, wherein the gas producer speed threshold is approximately 100% of maximum design speed.

16. A two-shaft gas turbine engine including the programmable logic controller of claim 12, the two-shaft gas turbine engine further including
the power transfer device configured to increase power to and remove power from the gas producer shaft.

* * * * *